Figure 1:
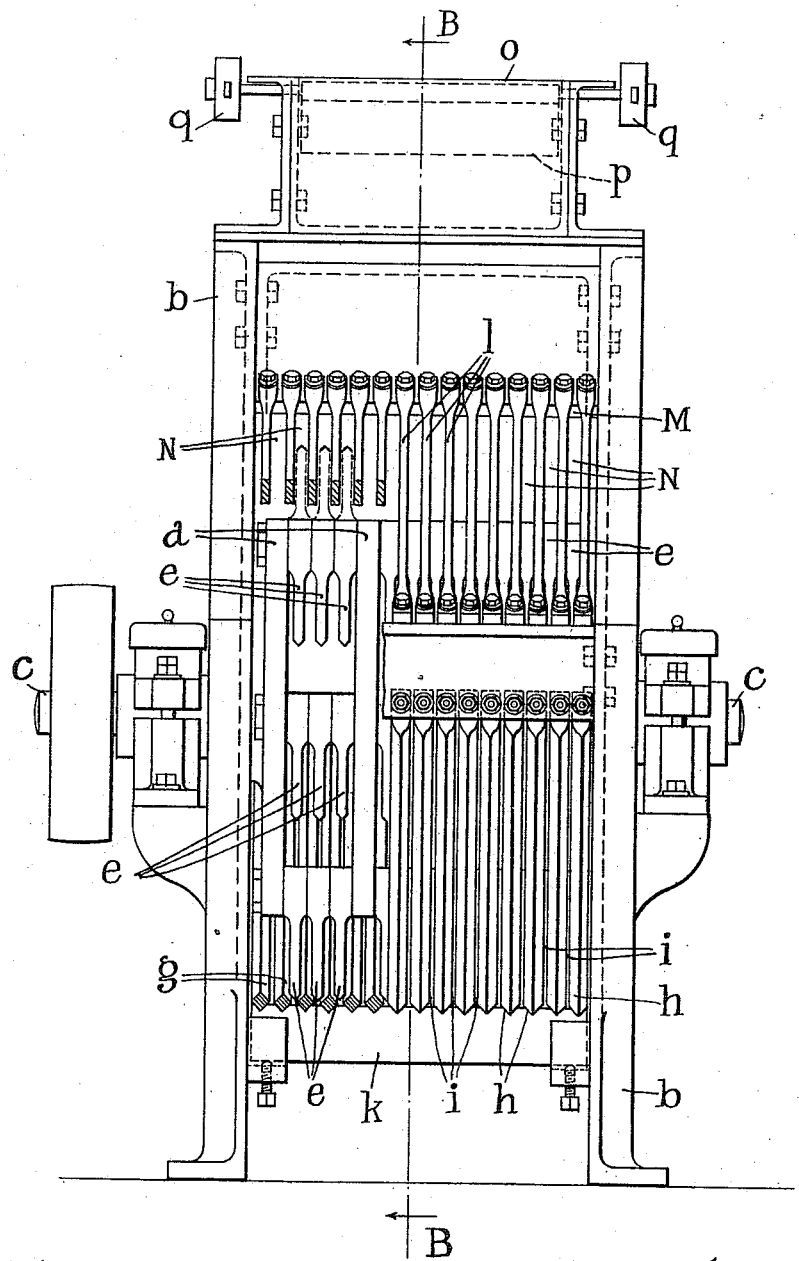

R. EMMOTT & T. MERCER.
ROTARY BEATER.
APPLICATION FILED SEPT. 2, 1910.

982,942.

Patented Jan. 31, 1911.

2 SHEETS—SHEET 1.

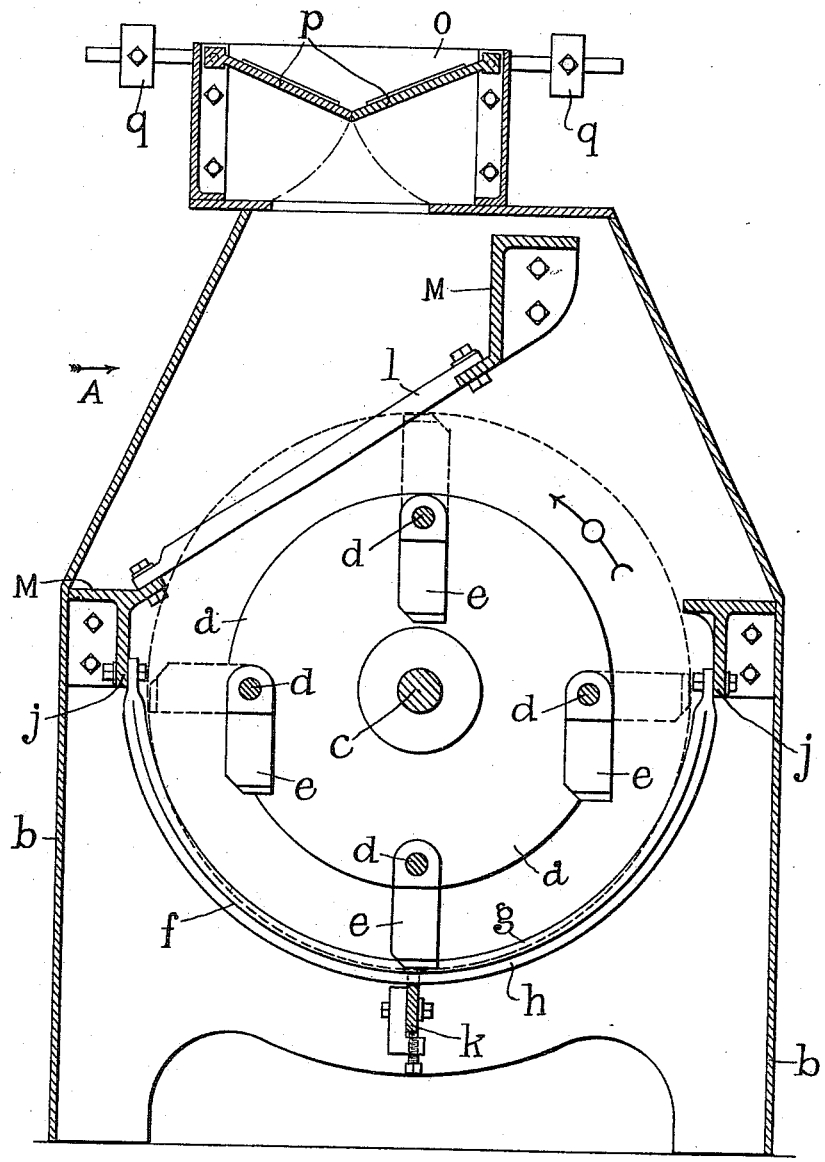

UNITED STATES PATENT OFFICE.

ROBERT EMMOTT AND THOMAS MERCER, OF ENTWISTLE, NEAR BOLTON, ENGLAND; SAID MERCER ASSIGNOR TO SAID EMMOTT.

ROTARY BEATER.

982,942.   Specification of Letters Patent.   Patented Jan. 31, 1911.

Application filed September 2, 1910. Serial No. 580,215.

*To all whom it may concern:*

Be it known that we, ROBERT EMMOTT and THOMAS MERCER, subjects of King George V of Great Britain, and residents of Entwistle, near Bolton, in the county of Lancaster, England, have invented certain new and useful Improvements in Rotary Beaters, of which the following description, in connection with the accompanying drawings, is a specification.

This invention relates to machines for pulverizing or disintegrating mineral or like substances or materials, of the type in which hammers or beaters are pivotally secured on shafts or studs carried by rotating disks and by the impact of said hammers or beaters upon the substances or materials fed to the machine, break up, crush or pulverize same, the object of our improvements being to provide means in conjunction with the hammers or beaters whereby a more effective action is obtained and the materials or substances are successfully broken up or pulverized to the desired degree of fineness.

According to our invention, we dispense with the grid or grids previously proposed to surround or inclose the disks carrying the hammers or beaters and through which the said hammers or beaters extend as they are thrown out by centrifugal action and, in lieu thereof, we employ a grid or grate extending partially around the disks at the lower sides thereof and clear of the beaters or hammers, the grid or grate being formed of angular bars so arranged as to form opposite each beater or hammer a V shaped groove or recess with a similar inverted V shaped groove or recess on the under side, there being a small space left between each bar to admit of the crushed or pulverized material passing therethrough when reduced to a given degree of fineness.

The extremities of the hammers or beaters extend into and nearly to the bottoms of the respective V grooves or recesses and by the successive rapid impacts of same upon the material fed into the machine, it is rapidly and effectively broken up or reduced to a degree of fineness which admits of same falling through the openings or interstices between the bars of the grating or grid and being delivered to a conveyer to be screened or otherwise dealt with.

Over the rotating disks carrying the hammers or beaters, we place an inclined grate or grid having openings or spaces therein of a given area through which the hammers or beaters are adapted to extend in the revolution of the disks and to beat upon the material as its first enters the machine and rests upon said grate or grid, this preliminary action reducing the shale, stone or other solid substance or material to smaller pieces capable of passing through the openings in the said grate and dropping down into the machine to be thoroughly pulverized or reduced to the desired degree of fineness between the hammers or beaters and the lower curved grid or grate.

In the accompanying drawings, to which reference is hereafter had:—Figure 1 is an edge or front view, looking in the direction of arrow A, Fig. 2, of a crushing, pulverizing or disintegrating machine constructed according to our invention, the front framing and some of the upper and lower series of bars being broken away, to show the parts clearly, and Fig. 2 is a transverse section, taken on line B, B, in Fig. 1.

Referring to the drawings, letter $a$ represents a series of disks inclosed within a framework $b$ and mounted on the main driving shaft $c$ of the machine, the disks having secured thereto a series of rods or spindles $d$ extending longitudinally through each disk and carrying loosely thereon, between each pair of disks, a series of beaters or hammers $e$ adapted to be thrown outwardly by centrifugal action as the disks revolve, the whole being constructed and arranged in the ordinary manner and forming no part of our invention.

In our invention, the grid or grids through which the hammers $e$ have previously been thrown to pulverize stone or the like are dispensed with and, in place thereof, we employ a grid or grate $f$ extending partially around the disks $a$ at the lower sides thereof and clear of the hammers, and composed preferably of a series of angular bars so disposed relatively one to the other as to form opposite the path of each beater or hammer a V shaped groove or recess $g$ with a similar inverted V shaped groove or recess $h$ on the under or outer side and leaving between each pair of angular bars, for the whole or practically the whole length thereof, a small space or opening $i$ to admit of the crushed or pulverized material passing therethrough when reduced to a given degree of fineness.

The angular bars of the grid or grate *f* are in this instance secured at each end to cross girths or rails *j*, *j*, and are preferably slightly eccentric to the disks *a* in order to give greater clearance to the beaters or hammers *e* on entering and leaving the grooves or recesses *g* than at the middle portion of their traverse through the said grooves or recesses.

The angular bars of the grate or grid *f* are adjusted truly with respect to each other and to the hammers or beaters *e* by the setting-up bar *k*.

In a suitable position over the disks *a* is supported an inclined grate or grid *l* preferably composed of single bars secured at each end to cross girths or rails *m*, *m*, and adjusted at equal distances apart to form openings or spaces *n* of a given area to suit the maximum size of the portions of the material to be fed into the machine and through which the hammers or beaters *e* are adapted to extend in the revolution of the disks and to beat upon the material as it first enters the machine and rests upon the said grate or grid.

The bars of the curved grate *f* are arranged closer together than the bars of the inclined grate *l*, and the hammers are arranged to work at a less depth between the bars of the grate *f* than between the bars of the grate *l*, so that the material is pulverized in two successive operations.

The stone or other hard material or substance to be crushed or pulverized is delivered into a hopper *o* the hinged doors *p* in which open out under the weight thereof and allow it to fall on to the grate or grid *l*, the doors being self-actingly closed after each delivery by the counter-balance weights *q*, *q*.

The blocks of stone or other material thus deposited on the grate *l* are struck in rapid succession by the hammers or beaters *e* as they are carried around by the revolving disks and thus broken up into small pieces adapted to fall by gravity through the spaces *n* on to the grate or grid *f* at one side thereof, the action of the hammers or beaters on the material lodging in the angular grooves *g* reducing it to the desired degree of fineness which permits of its escape through the openings *i*, the diverging walls of the bars at *h* immediately below said openings insuring the clearance of the ground or pulverized material from the grate or grid and avoiding any choking up or obstruction of the passages or openings.

The pulverized material may be delivered to a conveyer to be screened or otherwise dealt with.

The front wall of the inlet portion of the machine is preferably inclined as shown to minimize liability of the material banking up or blocking the thoroughfare.

The shape of the bars of the grid *f* is very effective in combination with the hammers or beaters entering into the grooves or recesses thereof, but not through the openings between the bars, in reducing the material to the fineness required.

The front edges of the hammers or beaters may be beveled or made knife edged as shown to give a cutting blow through the upper grate or grid *l*.

The machine could be used for stone breaking alone, or for grinding or disintegrating any other suitable substances or materials which it is and could be adapted to deal with.

Having thus described our invention, what we claim as new and desire to secure by Letters Patent is:—

1. In a rotary beater, the combination, with a casing, of a driving shaft journaled in the casing and having disks secured on it, hammers pivotally supported by the said disks, a flat grate secured in an inclined position above and to one side of the said shaft so that the hammers work in the spaces between its bars, and a curved grate secured with its middle part vertically under the said shaft and nearer to it than its end portions and so that the hammers work in the spaces between them but at a less depth, the said hammers and grates operating to pulverize the material in two successive operations.

2. In a rotary beater, the combination, with a casing, of a driving shaft journaled in the casing and having disks secured on it, hammers pivotally supported by the said disks, a flat grate secured in an inclined position above and to one side of the said shaft so that the hammers work in the spaces between its bars, a curved grate secured with its middle part vertically under the said shaft and nearer to it than its end portions, the bars of the said curved grate being arranged closer together than the bars of the flat grate and so that the hammers also work in the spaces between them but at a less depth, and a setting-up bar secured to the casing and engaging with the middle part of the curved grate.

In testimony whereof we affix our signatures in the presence of two witnesses.

ROBERT EMMOTT.
THOMAS MERCER.

Witnesses:
ERNALD SIMPSON MOSELEY,
MALCOLM SMETHURST.